United States Patent [19]

Yamamoto

[11] 4,375,204
[45] Mar. 1, 1983

[54] INTAKE DEVICE FOR INTERNAL COMBUSTION ENGINE

[75] Inventor: Tadahiro Yamamoto, Yokosuka, Japan

[73] Assignee: Nissan Motor Co., Ltd., Yokohama, Japan

[21] Appl. No.: 163,909

[22] Filed: Jun. 27, 1980

[30] Foreign Application Priority Data

Jul. 9, 1979 [JP] Japan .............................. 54-94367[U]

[51] Int. Cl.³ .............................................. F02B 77/00
[52] U.S. Cl. .................................. 123/52 M; 123/494; 73/118
[58] Field of Search ............... 123/494, 52 M; 55/274; 73/861.22, 861.23, 118, 204

[56] References Cited

U.S. PATENT DOCUMENTS

| | | | |
|---|---|---|---|
| 3,796,198 | 3/1974 | Mauch et al. | 123/494 |
| 3,818,877 | 6/1974 | Barrera et al. | 123/494 |
| 3,975,951 | 8/1976 | Kohama et al. | 123/494 |
| 4,063,905 | 12/1977 | Johnson et al. | 48/180 R |
| 4,142,407 | 3/1979 | Kuroiwa et al. | 73/118 |

FOREIGN PATENT DOCUMENTS

| | | |
|---|---|---|
| 2612427 | 11/1976 | Fed. Rep. of Germany . |
| 2714144 | 11/1977 | Fed. Rep. of Germany . |
| 2749575 | 5/1979 | Fed. Rep. of Germany ........ 73/204 |
| 2197114 | 3/1974 | France . |
| 2243341 | 4/1975 | France . |
| 371439 | 5/1973 | U.S.S.R. ........................... 73/861.21 |

*Primary Examiner*—Charles J. Myhre
*Assistant Examiner*—Andrew M. Dolinar
*Attorney, Agent, or Firm*—Thompson, Birch, Gauthier & Samuels

[57] ABSTRACT

An intake device for an internal combustion engine comprises an outwardly extending flange attached to a throttle barrel and a saucer-like member attached to the flange to form a ring-shaped intake passage therebetween. An air flow meter duct is arranged with the outlet disposed at the portion of the ring-shaped intake passage having the smallest cross-sectional area. The air flow velocity within the duct is equal to the velocity at this smallest cross-sectional area section, thus permitting measurement thereof by measuring the flow through the meter and scaling appropriately by the ratio of meter flow passage to intake passage cross-sectional areas.

6 Claims, 5 Drawing Figures

INTAKE DEVICE FOR INTERNAL COMBUSTION ENGINE

BACKGROUND OF THE INVENTION

The present invention relates to an intake device for an internal combustion engine, and more particularly to an improvement in an intake device including an intake passage provided with an air flow meter.

Referring to FIGS. 1 and 2, a prior art intake device will be described hereinafter. In the case of an Electronic Fuel Injection (EFI) system, it is the ordinary practice to control the quantity of fuel per each injection from an injector 4 (fuel injection valve) via a control circuit in response to a detect signal produced by an air flow meter (air flow sensor) 3, such as a Karman vortex type air flow meter or a heat wire type air flow meter, mounted to an intake passage 2 upstream of a throttle valve 1, to control the air/fuel ratio. Air passing through an air cleaner 5 flows through a honeycomb rectifier 7 positioned at the air flow meter inlet duct 6, then flows through a Karman vortex generator 3a to produce regulated vortex. With a heat wire type sensor incorporated in the vortex generator 3a, the generation frequency increases in proportion to the velocity of air and is detected and fed to the control circuit as its detect signal. Air passing through the vortex generator 3a flows through an air flow meter outlet duct honeycomb rectifier 8 and into an engine combustion chamber 10 via the throttle valve 1, injector 4 and intake valve 9. Also shown are a microprocessor 11 and a baffle plate 12 for fuel atomization. The air flow meter duct 6 comprises a tube having a rectangular section for stabilizing the vortex. This has necessiated providing two cylindrical adapters 13 and 14 secured to ends of the duct 6, to allow connection with the air cleaner 5 via a rubber duct 15 and with a throttle body 17 via a rubber duct 16.

The conventional intake device described above wherein various kinds of joints, such as adaptors 13, 14 must be employed for installation has a disadvantage that the piping is complicated, creating bulk and increasing cost. Where, as shown in FIG. 2, a single point injection (SPI) type EGI system is employed which uses a single injector 4 for supplying fuel to all of the combustion chambers, despite the demand that the overall system be as compact as a conventional carburetor, such arrangement causes an undesirable increase in overall engine height.

SUMMARY OF THE INVENTION

According to the present invention, there is provided an intake device for an internal combustion engine comprising an outwardly extending flange attached to a throttle barrel, a saucer-like member attached to the outwardly extending flange in a spaced relationship therefrom to define a ring-shaped intake passage therebetween. An air flow meter is arranged in the intake passage such that the outlet is disposed at the portion of the ring-shaped intake passage having the smallest cross-sectional area where the air flow speed is maximum. A vacuum is created at the location of the air flow meter outlet with the result that the flow velocity through the duct is equal to that at the intake passage section having the smallest area. Thus, this arrangement permits detecting the flow velocity at a point near the carburetor throat by measuring the flow through a uniform section of the ring-shaped passage.

It is therefore an object to provide a ring-shaped intake passage defined by an outwardly extending flange and a saucer-like member arranged in spaced relationship thereabove and by arranging the outlet of an air flow meter duct at the smallest area of the ring-shaped passage.

BRIEF DESCRIPTION OF THE DRAWINGS

The features and advantages of the intake device according to the present invention will be more clearly appreciated from the following description taken in conjunction with the accompanying drawings in which like reference numerals designate corresponding elements, and in which.

DESCRIPTION OF THE PREFERRED EMBODIMENT

Figure 1:
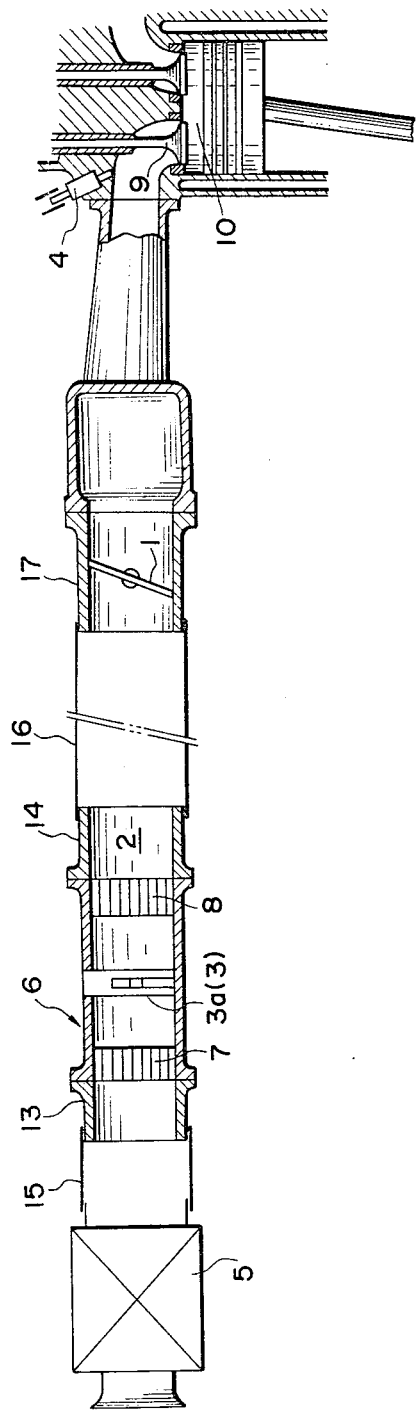
FIG. 1 is a longitudinal sectional view of a prior art intake device.

Referring to FIGS. 3–5, 21 designates a pressure regulator, 22 an air regulator, 40 a flame arrester for preventing a sensor 38 from backfire and for rectifying intake air. Formed upstream of a throttle valve 24 in an intake passage 25 is a horizontally and outwardly extending air intake port defining flange (duct adaptor) 26, and a saucer-like member (cap) 28 spaced a predetermined distance above the flange by a support pillar (support member) 27 in a manner to cover the latter and define a ring-shaped intake passage 29. The flange 26 is integrally attached to a so-called downdraft carburetor with attachment bolts 31 on the upper end of a throttle valve barrel 30, and the cap 28 is mounted thereon with attachment bolts 31a extending through each support pillar 27.

An annular air cleaner element 32 is disposed to surround an upstream side of the ring-shaped intake passage 29. An air cleaner cap 33 covering the air cleaner element 32 and the flange 26 define an air passage connecting the air cleaner element and the intake passage 29.

The smallest cross-sectional area of the ring-shaped intake passage 29 is located at the inner rim portion 43 of the outwardly extending flange 26. Radially inserted into the ring-shaped intake passage 29 is a tubular duct 37 having an air flow meter. The duct has a rectangular uniform cross-section, with an outlet 37a at the flange inner rim portion 43. The air flow meter duct 37 includes a Karman eddy type air flow sensor (or heat wire type air flow sensor) 38, and flow rectifiers 39 and 40 in the form of honeycomb elements arranged upstream and downstream of the sensor 38.

In operation, a portion of air passing through the air cleaner element 32 enters the air flow meter duct 37, passes through the flow rectifier 39 and the Karman eddy generator 38a. The sensor 38 detects eddy frequency to generate an air flow signal $I_1$ to an electronic control circuit 41. The electronic control circuit 41 calculates the time period for which the ON-OFF type injector 42 of SPI system downstream of the throttle valve 24 is turned on in response to the air flow signal and the engine ignition signal $I_2$ to actuate the injector to admit air/fuel mixture having the proper air/fuel ratio into the engine.

The air passing through the eddy generator 38a flows to the duct outlet 37a through the downstream flow rectifier 40, and into the engine via the throttle valve 24. Since the duct outlet 37a is disposed at the portion of the ring-shaped intake passage having the smallest cross-sectional area where the air flow speed is the maximum, the resulting vacuum causes the flow velocity of the air in the duct 37 to be equal to the flow velocity at the rim portion 43. Thus, the flow sensor (air flow detector) 38 disposed in the duct 37 detects a velocity equal to the velocity at the rim portion 43, so that the flow sensor output $I_1$ can be used as a signal representing the engine intake air if scaled by a factor representing the ratio of air flow duct to rim portion cross-section areas. In this manner, a flow meter may be used in a radial air flow passage to obtain an accurate measurement of flow into a carburetor or injector passage throat.

Figure 2:
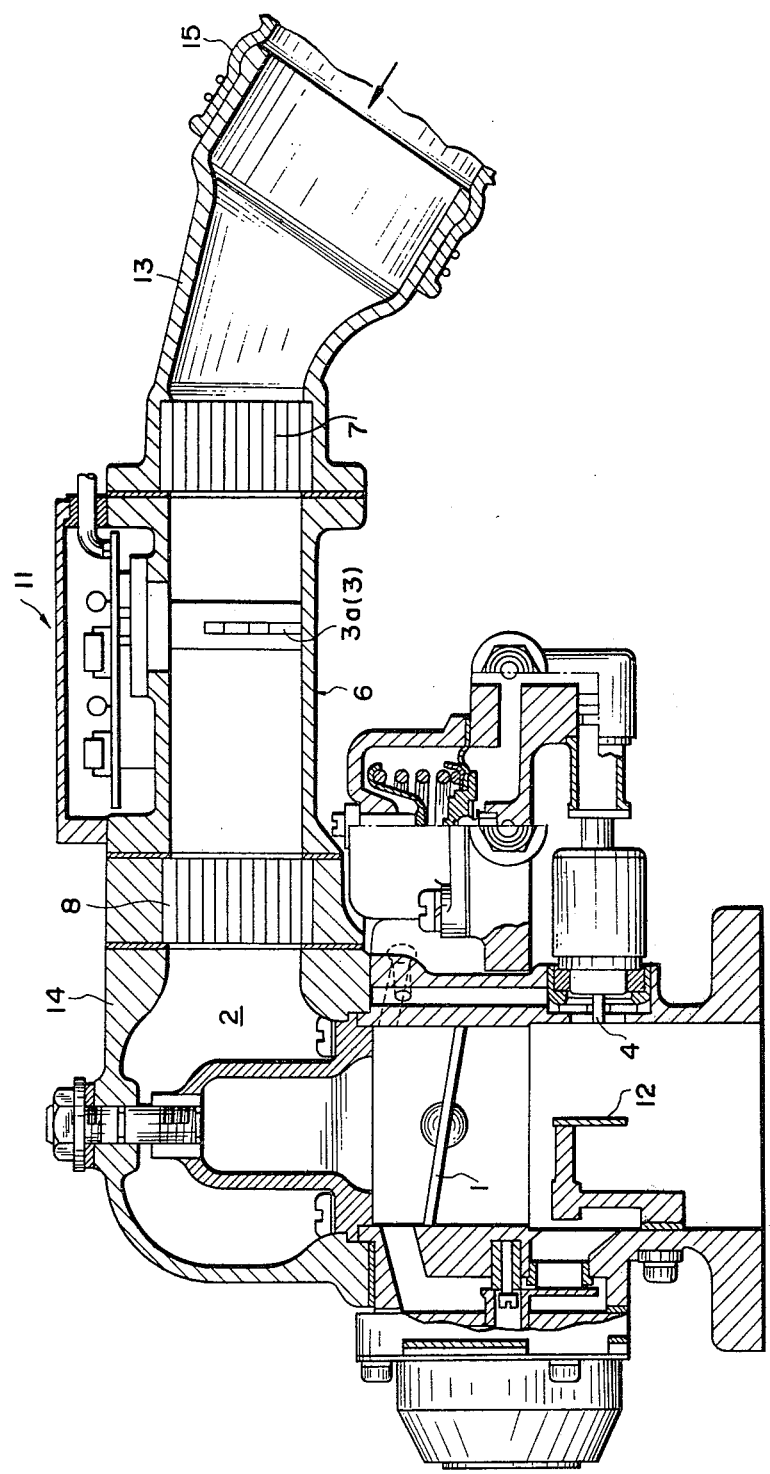
FIG. 2 is a longitudinal sectional view of a second prior art intake device.
Figure 3:
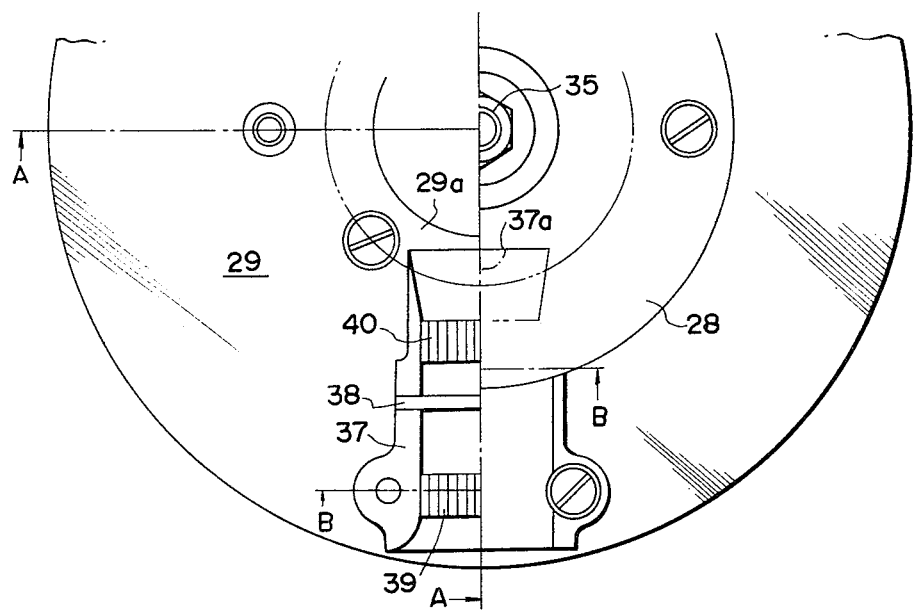
FIG. 3 is a top view, partly in section, illustrating a preferred embodiment of an intake device according to the present invention.
Figure 5:
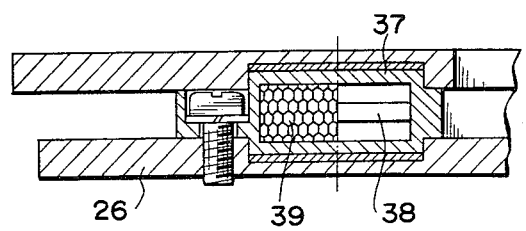
FIG. 5 is a section taken through the line B—B in FIG. 3.
Figure 4:
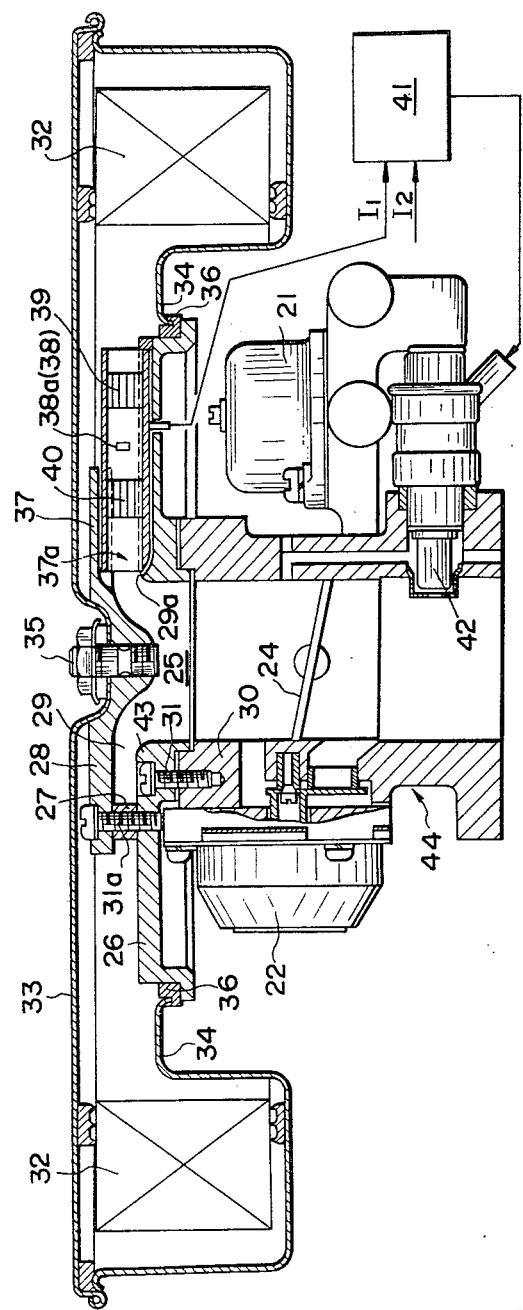
FIG. 4 is a longitudinal section taken through line A—A in FIG. 3.

According to the present invention, since the intake passage 29 is in the form of a ring-shaped passage, the overall height has been reduced considerably as compared to the conventional device employing the adaptor 14 (FIG. 2). Furthermore, where the Karman eddy type or heat wire type air flow sensor 38 is employed, although a considerable distance in the flow direction is required for sufficient air flow rectification, the present invention has solved this problem by arranging the air flow sensor duct 37 radially within the ring-shaped passage inside the air cleaner, while maintaining the distance from the throttle barrel 44 to the air cleaner cap 33 at a minimum, facilitating installation.

It will be appreciated by those skilled in the art that the rectangular cross-section of the air flow duct 37 generates regular Karman eddies, resulting in improved air flow detection. Positioning the duct outlet at the location of maximum flow velocity within the intake passage 29 results in the flow through the meter approximating that within the entire passage. In this manner, the flow through the meter can be measured accurately to reflect the actual velocity through the intake passage 29. By positioning the cap 33 close to the throat opening to define the radial air flow passage, the overall carburetor/air cleaner height can be reduced.

Although the preferred embodiment has been described as applied to SPI type EGI, the present invention can be applied to other types of EGI in the same manner.

What is claimed is:

1. An intake device for an internal combustion engine, comprising:
   a throttle barrel having a throttle valve located therein;
   an outwardly extending flange disposed upstream of said throttle valve at the inlet end of said throttle barrel;
   an air cleaner assembly mounted on said flange;
   a saucer-like member cooperating in spaced relationship with said flange to define a ring-shaped intake passage within said air cleaner assembly through which air is inducted into the inlet end of said throttle barrel; and
   a single air flow meter assembly mounted between said flange and said saucer-like member and including (a) a single duct through which a fraction of the air inducted into said throttle barrel flows, said duct having a single inlet and a single outlet and disposed in said ring-shaped intake passage and having said single outlet located in a portion of said ring-shaped intake passage adjacent to said throttle barrel and (b) a Karman eddy type sensor disposed within said single duct.

2. An intake device as claimed in claim 1, wherein said duct of said air flow meter includes an upstream rectifier disposed in said duct upstream of said Karman eddy type sensor and a downstream rectifier disposed in said duct downstream of said Karman eddy type sensor.

3. In an internal combustion engine having an induction conduit, an intake assembly comprising
   an air cleaner assembly;
   an annular air-flow space defining means disposed within said air cleaner assembly and at the upstream end of said induction conduit for causing air to flow radially inward toward the longitudinal axis of said induction conduit;
   a single duct through which a fraction of the air inducted into said induction conduit flows, and which is disposed in said annular air flow space defining means so as to divide said annular air-flow space into a small portion defined within said duct and a larger portion defined outside said duct, said small portion being oriented radially with respect to said longitudinal axis, said duct having a single inlet and a single outlet, said outlet being disposed adjacent the upstream end of said induction conduit; and
   Karman eddy type air flow sensor means disposed within said duct.

4. A combination as claimed in claim 3, wherein said duct is provided with a first air flow rectifier upstream of said air flow sensor means and a second air flow rectifier downstream of said air flow sensor means.

5. A combination as claimed in claim 3, wherein said annular air flow space defining means is a saucer-like member spaced above a flange surrounding said upstream end of said induction conduit.

6. A combination as claimed in claim 4, wherein said duct has a rectangular cross-section.

* * * * *